United States Patent

[11] 3,562,417

[72] Inventor Rocco Poppa
Addison, Ill.
[21] Appl. No. 737,757
[22] Filed June 17, 1968
[45] Patented Feb. 9, 1971
[73] Assignee Zenith Radio Corporation
Chicago, Ill.
a corporation of Delaware

[54] SIGNAL-TRANSLATING FILTER NETWORK FOR A TELEVISION RECEIVER
5 Claims, 2 Drawing Figs.

[52] U.S. Cl. .......... 178/5.8, 325/477, 333/28, 333/75, 333/76
[51] Int. Cl. .......... H04n 5/62
[50] Field of Search .......... 333/75, 76, 28 (Inquired); 325/327, 331, 477; 178/5.8, 5.8A

[56] References Cited

UNITED STATES PATENTS 2,503,540 4/1950 Augustadt .......... 333/28
2,567,380 9/1951 Kingsbury .......... 333/75
2,584,386 2/1952 Hare .......... 333/75
3,204,025 8/1965 Przybyszewski .......... 178/5.8
3,289,116 11/1966 Darlington .......... 333/76

*Primary Examiner*—Richard Murray
*Assistant Examiner*—Joseph A. Orsino, Jr.
*Attorneys*—Francis W. Crotty and James E. Tracy

ABSTRACT: Three tuned signal attenuation circuits are usually needed between the RF tuner and first IF amplifier in a television receiver for adjusting the relative amplitudes of the components of the IF signal to properly shape the IF band-pass characteristic so that adjacent channel interference is precluded and a particular amplitude ratio or weighting is established with respect to the associated video and sound IF carriers, as is required for intercarrier operation. Two of the attenuation circuits may take the form of bridged-T traps which share the same input, output and common terminals and the same resistive sound IF carrier, while the other attenuates either the associated sound IF carrier or the adjacent video IF carrier. The use of a common bridging arm minimizes insertion loss and maximizes gain.

PATENTED FEB 9 1971 3,562,417

Figure 1:
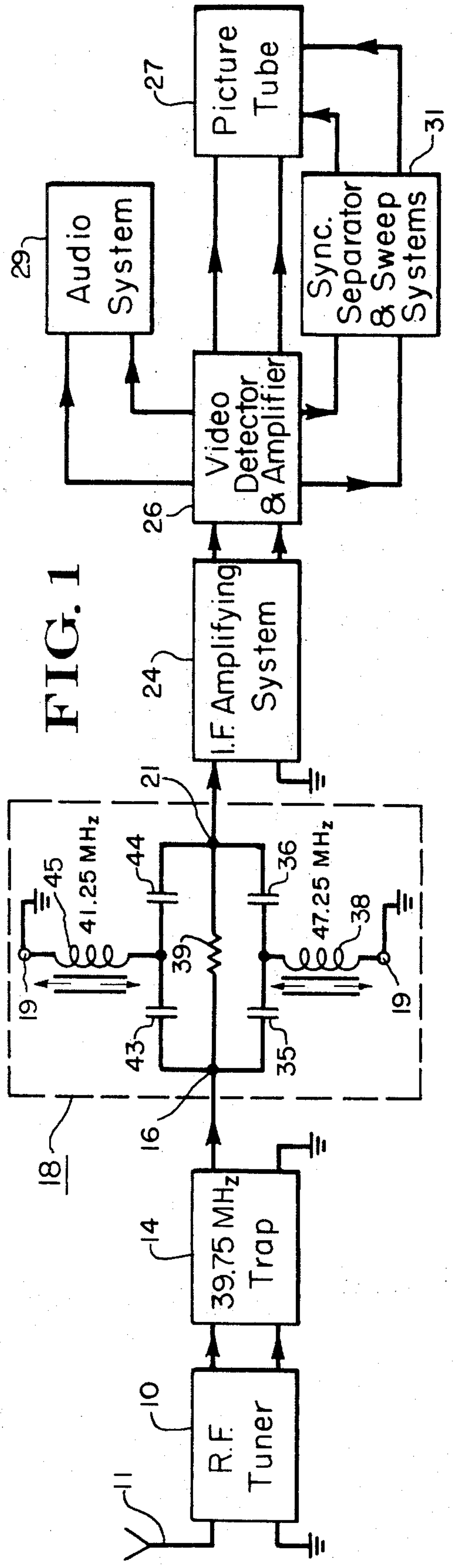

Inventor
Rocco Poppa
By James E. Tracy
Attorney

SIGNAL-TRANSLATING FILTER NETWORK FOR A TELEVISION RECEIVER

This invention pertains to a novel filter network which is particularly useful in shaping the frequency response curve of the IF (or intermediate frequency) amplifying system of a television receiver of the intercarrier type, and will be described in such an environment.

In a conventional television receiver, whether of the monochrome or color variety, an RF (or radio frequency) tuner facilitates the selection of a desired television signal, conveyed in a particular television channel, from the television signals of the several other channels that are usually available in a given location. Under the television transmission standards existing in the United States, each television channel occupies a total bandwidth of 6 megahertz and a transmitted television signal includes two different RF carriers separated in the frequency spectrum by 4.5 megahertz. The lower frequency carrier is amplitude modulated by the picture or video information while the higher frequency RF carrier is frequency modulated by the sound or audio information. In accordance with the superheterodyne technique, the two received RF carriers of the selected channel are beat or heterodyned in the RF tuner with a local oscillator signal to produce an intermediate frequency signal which includes, and is a combination of, an amplitude modulated associated video IF carrier and a frequency modulated associated sound IF carrier having a fixed frequency separation of 4.5 megahertz from one another. The precise frequencies of the two IF carriers are determined by the operating frequency of of the local oscillator included in the tuner; this frequency may be varied by the viewer by adjustment of the receiver's fine tuning control.

The frequency response characteristic of the IF amplifying system has a bandwidth and shape to accommodate both the associated video and sound IF carriers as well as their bands of modulation components, and under strong or normal signal conditions optimum tuning of both picture and sound is achieved when the viewer adjusts the local oscillator so that the video and sound IF carriers fall on opposite slopes or skirts of the response curve. Specifically, and in accordance with present industry practice, optimum tuning is obtained when the associated sound IF carrier is established at 41.25 megahertz and the associated video IF carrier at 45.75 megahertz.

Furthermore, for best operation the response characteristic is shaped so that the associated sound IF carrier falls well down on its skirt and very near one end of the passband. The response at the sound IF will thus be substantially less than that at the video IF, which is a necessary condition in an intercarrier receiver in order that beat signals which may develop between the associated sound and video IF carriers are unnoticed in the reproduced image. The required weighting of the IF carriers is customarily achieved by attenuating the sound IF carrier in a trap circuit, tuned to 41.25 megahertz, located between the RF tuner and the first amplifier stage of the IF amplifying system.

Since only 6 megahertz of the frequency spectrum is devoted to each channel and since the channels serving a given reception area are frequently positioned immediately adjacent one another, undesired adjacent channel RF carriers will pass through the RF tuner and be converted into undesired signal components (called adjacent IF carriers) in the IF signal produced in the tuner output. Protection against such adjacent channel interference is obtained by shaping the IF band-pass curve. Beyond the ends of the band of frequencies conveying the desired modulation components of the associated IF carriers, the response is therefore attenuated rather sharply. This is accomplished by interposing, in the coupling circuit between the output of the RF tuner and the input of the first IF stage, one attenuation trap tuned to 39.75 megahertz to reject the video IF carrier of the upper adjacent channel, and another attenuation trap tuned to 47.25 megahertz to reject the sound IF carrier of the lower adjacent channel. The closest undesired RF carriers are the video RF carrier of the channel immediately above the selected channel and the sound RF carrier of the channel immediately below. Traps tuned to 39.75 and 47.25 megahertz will suppress the IF counterparts of the undesired RF carriers.

A total of three tuned signal attenuation circuits are thus required at the input of the IF amplifying system. Unfortunately, due to the close proximity of the rejected frequencies to the modulation components of the associated video IF carrier the three filters introduce an undesired inband insertion loss, namely attenuation of the signal components falling within the IF passband. It is important that the required three traps be constructed so that any attenuation of the desired video components be minimized. The inband insertion loss should be made as small as possible to optimize performance and achieve maximum gain with respect to the picture information conveyed by the IF signal. This is of particular concern in a color receiver where the chrominance information is modulated on an IF carrier having a frequency of 42.17 megahertz. The response should be maximized for the modulation components of the 42.17 megahertz carrier as well as for those of the 45.75 megahertz carrier.

Most of the previously developed filter networks for processing the IF signal are relatively complex and expensive. Of more importance, however, these prior networks introduce a substantial amount of inband insertion loss and thus deleteriously affect the operation of the receiver. Applicant's filtering arrangement, on the other hand, not only represents a cost savings over prior attenuating networks but also results in a significantly smaller insertion loss than that attainable heretofore.

It is, therefore, an object of this invention to provide a new and improved signal-translating filter network for shaping the IF band-pass characteristic of the television receiver.

It is another object to provide a new and improved filter network for rejecting certain undesired components of an IF signal without attenuating the desired components to the extent to which they are suppressed by prior filter networks.

It is a further object of the invention to provide a novel filter network of relatively simple and inexpensive construction but yet introducing a considerably smaller inband insertion loss than previously attainable.

An additional object is to combine a plurality of traps in a network in such a manner that the total insertion loss introduced by the network is equal to, or only slightly greater than, that introduced by any one of the traps alone.

The signal-translating filter network of the invention is to be incorporated in a television receiver of the intercarrier type in which the video and sound RF carriers of a desired television signal, received over a selected television channel, are respectively converted by an RF tuner into associated video and sound IF carriers, and in which the video RF carrier of an undesired television signal received over the upper adjacent channel and the sound RF carrier of an undesired television signal received over the lower adjacent channel are respectively converted by the RF tuner into adjacent video and sound IF carriers. In accordance with the invention, the filter network comprises a first bridged-T trap having input, output and common terminals and including a substantially resistive bridging arm between its input and output terminals, the trap being tuned to attenuate the adjacent sound IF carrier. The network also includes a second bridged-T trap having the same input, output and common terminals as the first trap and sharing the same bridging arm with the first trap. The second trap is tuned to attenuate a selected one of the associated sound and adjacent video IF carriers.

Figure 2:
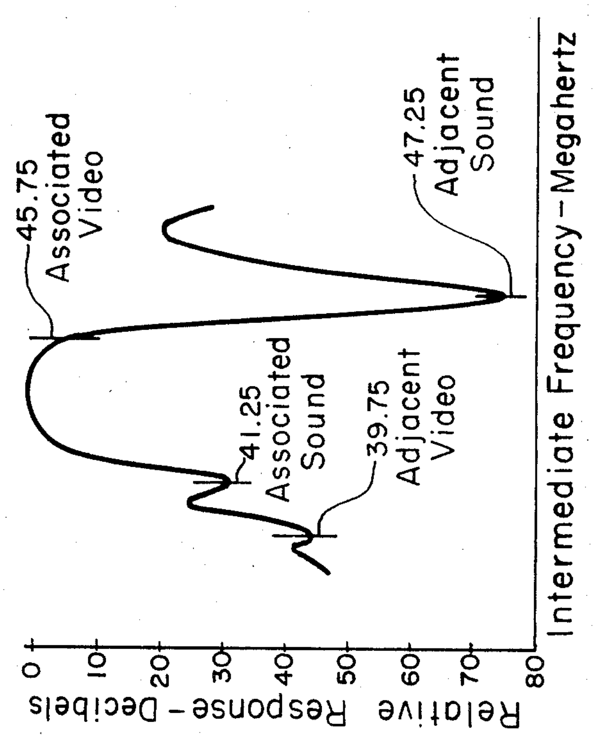

The features of this invention which are believed to be new are set forth with particularity in the appended claims. The invention, together with further objects and advantages thereof, may best be understood, however, by reference to the following description in conjunction with the accompanying drawing in which:

FIG. 1 is a schematic representation, partially in the form of a block diagram, of a television receiver including a filter network constructed in accordance with the invention; and FIG. 2 illustrates the IF band-pass characteristic of the receiver of FIG. 1.

Referring now more particularly to FIG. 1, the arrangement there represented is a television receiver of the intercarrier type and employing the principle of superheterodyne reception. Moreover, the illustrated television receiver is of the monochrome or black and white variety, although it will be obvious that the filter network of the invention may very advantageously be incorporated in a color television set. The representation selected leads to simplification of the drawing, and is not to be considered as a restriction on the application of the invention.

The receiver of FIG. 1 includes a conventional RF tuner 10 having its input terminals connected to a receiving antenna 11. Tuner 10 customarily comprises a tunable RF amplifier, a variable frequency local oscillator, and a mixer having a tuned or frequency-selective output circuit. When the tuner is positioned to tune the television receiver to a selected television channel the video and sound RF carriers of the television signal transmitted over that selected channel are converted by tuner 10 by heterodyning action into associated video and sound IF carriers, the frequencies of which are determined by the local oscillator. The two associated IF carriers and their modulation components are included in the IF signal produced by tuner 10, which signal is developed in the tuned output circuit of the mixer.

For any given selected channel, the local oscillator signal has a frequency higher than each of the received RF carriers by a fixed amount as determined by the frequencies of those RF carriers and the frequencies of the two associated IF carriers to be produced. For example, if tuner 10 is adjusted to select a television signal conveyed over channel 3, under United States standards the video RF carrier of the received television signal will have a frequency of 61.25 megahertz and the sound RF carrier will be established at 65.75 megahertz. Since optimum tuning is achieved when the associated sound and video IF carriers fall at 41.25 and 45.75 megahertz respectively, the oscillator is tuned to oscillate at 107 megahertz for channel 3 reception. Heterodyning of 107 megahertz with 61.25 and 65.75 megahertz will produce difference modulation components of 107—61.25 or 45.75 megahertz and 107—65.75 or 41.25 megahertz. Of course, the tuned output circuit of the mixer must be appropriately broadly tuned so that both of the associated IF carriers are developed therein.

Since the video RF carrier of the channel immediately above and the sound RF carrier of the channel immediately below that to which tuner 10 is tuned are relatively close to the video and sound RF carriers of the desired television signal, the two undesired adjacent RF carriers are accepted and converted by the RF tuner and manifest in the tuner output signal as adjacent video and sound IF carriers. The tuned circuits in tuner 10 cannot be sufficiently broadly tuned to accept the sound and video RF carriers of the desired television signal without at the same time accepting the video RF carrier of the higher channel, which is only 1.5 megahertz above the sound RF carrier of the selected channel, and the sound RF carrier of the lower adjacent channel which is only 1.5 megahertz below the video RF of the desired channel.

The video RF carrier of the upper adjacent channel manifests in the tuner output signal at a frequency of 39.75 megahertz, while the sound RF carrier of the lower adjacent channel is reflected in that output signal at a frequency of 47.25 megahertz. To more clearly understand the determination of the precise frequencies of the adjacent video and sound IF carriers, consideration will be given to the effect of the channel 2 and channel 4 television signals on the operation of tuner 10 when the tuner is conditioned to receive the Channel 3 television signal. The channel 2 video and sound RF carriers are established at 55.25 and 59.75 megahertz respectively, while the channel 4 video and sound RF carriers are positioned at 67.25 and 71.75 megahertz respectively. Since the local oscillator generates a signal of 107 megahertz during channel 3 reception, beating of that signal with the lower adjacent sound RF (i.e. 59.75 megahertz) produces a signal of 107—59.75 or 47.25 megahertz. Heterodyning of the oscillator signal with the upper channel video RF (i.e. 67.25 megahertz) develops a signal of 107— 67.25 or 39.75 megahertz. The video RF carrier of Channel 2 and the sound RF carrier of channel 4 are sufficiently frequency spaced from channel 3 that they will ordinarily not be accepted and processed by tuner 10.

The 39.75 and 47.25 megahertz IF carriers must therefore be attenuated or suppressed in order that only the desired components of the IF signal are amplified and employed for picture and sound reproduction. Accordingly, the output of tuner 10 is coupled to an attenuation trap 14 tuned to 39.75 megahertz to reject the adjacent video carrier and its modulation components. Trap 14 may take any of a variety of well-known forms. For example, it may comprise a series resonant combination of an inductance coil and a capacitor shunted across the output of tuner 10 and having a zero or very small transfer function at the rejection frequency.

The lower output terminal or of rejection trap 14 is connected to a plane of reference potential such as ground, while its upper output terminal is connected to the input terminal 16 of a signal translating filter network 18 embodying the invention. More detailed consideration will be given to network 18 later, but suffice it to say at this juncture that the network includes two tuned attenuation traps —one for rejecting the undesired 47.15 megahertz component and the other to introduce a measured amount of attenuation to the 41.25 megahertz associated sound IF carrier.

Network 18 has a grounded common terminal 19 and an output terminal 21 connected to one input terminal of an IF amplifying system 24, its other input terminal being returned to ground. System 24 preferably includes at least three amplifier stages and is capable of amplifying the IF signal to the extent necessary before video and sound detection. The output of amplifying system 24 is coupled to the input of a unit 26 which contains a video detector, for detecting or deriving the video information from the video IF carrier to develop a composite video signal, and an amplifier for amplifying the composite video signal. The amplified video signal is then delivered to the input of a picture tube or image reproducer 27.

In accordance with intercarrier practice, an intercarrier component comprising a carrier of 4.5 megahertz modulated with the sound information is developed in the video detector and separated in a suitable frequency-selective load included in the video amplifier. The intercarrier component is supplied to a conventional audio system 29 which contains appropriate sound demodulating and amplification circuitry and a speaker.

The video amplifier is also coupled to the input of a synchronizing signal separator which separates the horizontal and vertical synchronizing components from the composite video signal for application to suitable sweep systems which in turn effect two-dimensional scanning of picture tube 27. For convenience, the sync separator and sweep systems have been schematically illustrated by a single block 31.

While not specifically shown, an automatic gain control system is preferably included so that the gain of the RF amplifier and at least one of the IF amplifiers is regulated in response to signal strength variations of the selected television signal.

Aside from the construction of filter network 18, the described arrangement is a television receiver of conventional design and construction, the operation of which is well understood in the art and need not be further explained. Accordingly, attention will now be directed to the specifics of network 18. Coupled between terminals 16 and 21 is a pair of series-connected capacitors 35, 36, the junction of which is connected to the grounded common terminal 19 through an inductance coil 38. A bridging resistor 39 is also connected between terminals 16 and 21. The combination of units 35-

—39 constitutes one conventional form of a bridged-T trap circuit and is tuned to resonate at, and hence reject, the adjacent sound carrier frequency or 47.25 megahertz as indicated in the drawing. Such a bridged-T trap is essentially a compensated series-resonant circuit shunting the line, thus presenting a very low impedance between terminals 16 and 19 at the rejection frequency even though coil 38 may have a significant amount of equivalent series resistance. Resistor 39, which constitutes the bridging arm of the trap, effectively compensates or neutralizes the equivalent series resistance of the coil. Neutralization of the coil series resistance by means of bridging resistor 39 permits the realization of extremely high attenuation of the adjacent sound IF carrier. Maximum rejection or complete nulling out is obtained when the bridging resistance is approximately four times the coil resistance.

Preferably the inductance of coil 38 is made adjustable so that the adjacent sound trap may be precisely tuned. Coil 38 may take the form of that described and claimed in U.S. Pat. No 3,356,969, issued Dec. 5, 1967 to Adam W. Przybyszewski, and assigned to the present assignee. A coil construction is disclosed in that patent which comprises a pair of differently constituted and independently adjustable tuning cores. When one of the cores is adjusted both the inductance and resistance of the coil are varied, with the result that the $Q$ of the coil remains essentially constant. Movement of the other core produces predominantly variations in the equivalent resistance of the coil and thus the $Q$ of the coil. With this construction, one of the cores of coil 38 may be adjusted to tune the trap to 47.25 megahertz, while the position of the other core may be varied to change the equivalent resistance of the coil, and hence the ratio between the bridging and coil resistances, so that a desired attenuation level may be selected. Variations from the optimum four-to-one ratio lowers the amount of attenuation from that otherwise obtainable.

The mere presence of an adjacent sound trap necessarily introduces some attenuation or inband insertion loss to the desired modulation components of the associated video IF carrier, as is the case with all of the 47.25 megahertz traps employed in television receivers. As is customary in the prior filter networks, the required 41.25 megahertz associated sound trap is coupled in cascade with the 47.25 megahertz trap, as a consequence of which the inband insertion loss is further increased. In many cases the total insertion loss is double that introduce by one trap alone.

In accordance with the invention, however, attenuation of the 41.25 megahertz associated sound IF carrier is achieved without adding any significant inband insertion loss to that introduced by the 47.25 megahertz trap. The second trap exhibits a minimal insertion loss when combined with the first trap in the manner disclosed by the applicant. The insertion loss introduced by network 18 is thus no more than half of that which prevails in previously developed filter arrangements wherein the 47.25 and 41.25 megahertz traps are connected in cascade.

More specifically, in network 18 the 41.25 megahertz trap takes the form of a bridged-T trap circuit of a construction similar to and sharing the same input, output and common terminals and resistive bridging arm with the 47.25 megahertz trap. The associated sound filter includes a pair of series-connected capacitors 43, 44 with an inductance coil 45 connected between the junction of the capacitors and common terminal 19.

As in the case of the adjacent sound trap, coil 45 preferably is constructed in the manner disclosed in the aforementioned Przybyszewski patent. Its two cores may conveniently be adjusted to realize precise tuning of the trap to 41.25 megahertz while also establishing the particular attenuation level necessary for proper weighting of the associated sound and video IF carriers in accordance with the intercarrier technique.

The influence of filters 14 and 18 in shaping the IF response characteristic is shown by the curve in FIG. 2 which plots the relative response or gain of the entire IF amplifying system as a function of signal frequency. Trap 14 notches the frequency response characteristic at 39.75 megahertz, which attenuates the video carrier of the upper adjacent channel by approximately 45 decibels (or db.); this is sufficient to prevent any observable interference in the reproduced image. The 41.25 megahertz trap in network 18 establishes a notch in the bandpass characteristic at that frequency to suppress the sound IF carrier of the selected channel by 32 db. as required to prevent image distortion attributable to the intercarrier beat between it and the 45.75 megahertz video IF carrier of the selected television signal. The 47.25 megahertz trap is adjusted so that approximately 76 db. rejection is introduced at that frequency so that the lower adjacent channel sound signal is attenuated to the extent necessary to preclude interference in the reproduced picture.

One embodiment of the filter network of FIG. 1 that has been constructed and successfully operated employed the following circuit components which are given by way of illustration and not limitation of the invention:

| | |
|---|---|
| capacitor 35 | 5 pf. |
| capacitor 36 | 5 pf. |
| coil 38 | 15 turns 026 wire |
| resistor 39 | 12 ohms. |
| capacitor 43 | 4.25 pf. |
| capacitor 44 | 4.25 pf. |
| coil 45 | 15 turns 026 wire. |

If desired, trap 14 may be constructed and tuned to attenuate the 41.25 associated sound carrier and the bridged-T trap, made up of elements 39 and 43—45, may be tuned to resonate at 39.75 megahertz. One of the traps of filter 18 may thus be employed to attenuate either the associated sound carrier or the adjacent video carrier.

Furthermore, three or more bridged-T traps may share the same bridging resistor. For example, a third trap tuned to 35.25 megahertz, which is the IF counter part of the sound RF carrier of the upper adjacent channel, may be incorporated in network 18.

The invention provides, therefore, a novel and inexpensive filter network, for attenuating certain IF carriers, in which two bridged-T traps are bridged from and share the same resistor, the result of which is that the inband insertion loss is substantially less than that ordinarily introduced by prior traps designed to attenuate the same IF carriers.

While a particular embodiment of the invention has been shown and described, modifications may be made, and it is intended in the appended claims to cover all such modifications as may fall within the true spirit and scope of the invention.

I claim:

1. A signal-translating filter network for use in a television receiver having a RF tuner providing associated video and sound IF carriers generated from a desired television signal received over a selected television channel as well as undesired adjacent video and sound IF carriers derived from upper and lower channels adjacent to the selected channel, comprising in combination:
   a first bridged-T trap and coupling means having an input terminal coupled to said tuner, an output terminal for coupling to a load, and a common terminal returned to a plane of reference potential, said coupling and trap means including a bridging resistance connected between said input and output terminals, a pair of capacitors serially connected in parallel with said resistance, and a tunable inductance connected between the junction of said capacitors and said plane of reference potential, said inductance being tuned to form a series-resonate trap at said adjacent sound IF carrier frequency, said inductance including means to adjust the virtual resistance as presented thereby to a selected value to maximize the attenuation effected for signals at said adjacent sound carrier frequency; and a second bridged-T trap and coupling means connected in parallel with said first bridged-T means and including an additional pair of capacitors serially connected in parallel with said bridging resistance and an additional tunable inductance connected between the junction of said additional capacitors and said plane of reference potential, said additional inductance being tuned to form a series-resonate trap at a selected one of said associated sound and adjacent video IF carriers, said additional inductance including means to adjust the virtual resistance as presented thereby to a selected value to determine the level of attenuation effected for signals at said selected one of said carriers.

2. A signal-translating filter network in accordance with claim 1 wherein said bridging resistance consists of a fixed-value resistor.

3. A signal-translating filter network in accordance with claim 1 wherein said inductance in said first bridged-T trap and coupling means includes a virtual resistance of approximately one-fourth the impedance of said bridging resistance.

4. A signal-translating filter network in accordance with claim 1 wherein said additional inductance in said second bridged-T trap and coupling means is tuned to attenuate signals at said associated sound IF carrier.

5. A signal-translating filter network in accordance with claim 1 wherein said additional inductance in said second bridged-T trap and coupling means is tuned to attenuate said adjacent IF carrier.